United States Patent Office 3,694,411

Patented Sept. 26, 1972

3,694,411

LIGHT-SENSITIVE POLYMERS

John A. Ford, Jr., Rochester, N.Y., assignor to Eastman Kodak Company, Rochester, N.Y.

No Drawing. Filed Aug. 1, 1969, Ser. No. 846,958
Int. Cl. C08g *43/00;* C08f *27/00*
U.S. Cl. 260—47 EP 10 Claims

ABSTRACT OF THE DISCLOSURE

A novel class of light-sensitive polymers and their use in photographic reproduction is described which contains a 1-arylmethyleneindene group or a 5-arylmethylene-2(5H)-furanone group attached to a polymer backbone.

This invention relates to photographic reproduction. In a particular aspect it relates to a novel class of light-sensitive polymers and the use of such polymers in the preparation of photographic images.

It is known in the photographic art to reproduce images by processes which involve imagewise exposure of a coating of a radiation-sensitive material, the solubility of which is differentially modified by the action of radiation, and subsequent treatment of the coating with a solvent or solvent system which preferentially removes portions of the coating in accordance with its exposure to light. Such processes have been employed to prepare lithographic printing plates, stencils, photoresists, and similar photomechanical images. Among the radiation-sensitive materials which have been used in such processes, are light-sensitive polymers which are insolubilized or hardened on exposure to light. Typical of these radiation-sensitive materials are the cinnamic acid esters of polyvinyl alcohol such as are described in Minsk U.S. Pat. 2,725,372.

The different applications in which light-sensitive polymers are used requires that such polymers be available with a variety of photographic and physical characteristics. Thus, there is a continual search for novel light-sensitive polymers which improve upon and differ from existing light-sensitive polymers. I have found a novel class of light-sensitive polymers which have high photographic speed and a wide range of spectral response even in the absence of a sensitizer. Unsensitized light-sensitive polymer layers are often desired for certain photomechanical applications since fluorescence of the sensitizer often results in poor resolution in the photomechanical image.

Accordingly, it is an object of this invention to provide a novel class of light-sensitive polymers.

It is a further object of this invention to provide a novel class of light-sensitive polymers having high photographic speed and a wide range of spectral response.

It is a further object of this invention to provide novel light-sensitive polymers which have high photographic speed and which are sensitive to radiation in the visible region of the spectrum in the absence of a sensitizer.

It is another object of this invention to provide photosensitive compositions and elements containing this novel class of light-sensitive polymers.

It is still another object of this invention to provide processes for preparing photomechanical images employing these novel light-sensitive polymers.

The above and other objects of the invention will become apparent to those skilled in the art from the further description of the invention which follows.

In accordance with the present invention there is provided a novel class of light-sensitive polymers which contain as the light-sensitive moiety a 1-arylmethyleneindene group or a 5-arylmethylene-2(5H)-furanone group attached to the polymer backbone. The point of attachment of the light-sensitive moiety to the polymer backbone can either be on the indene or furanone nucleus or on the aryl group. When the polymer backbone is derived from a hydroxyl-containing polymer, the light-sensitive moiety is attached through a carbonyloxy linkage; when the polymer backbone is derived from a polymer containing reactive amino groups, the attachment is through an amido linkage; and when the polymer backbone is derived from a polymer containing reactive anhydride groups, the attachment is through an oxycarbonyl linkage.

The light-sensitive indene and furanone moieties which are attached to the light-sensitive polymers of this invention can be represented by the following structural formulae:

(I)

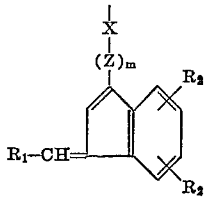

(II)

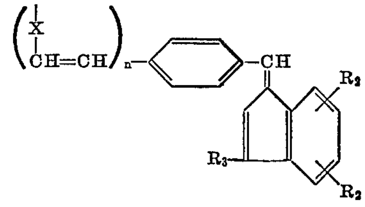

(III)

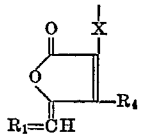

(IV)

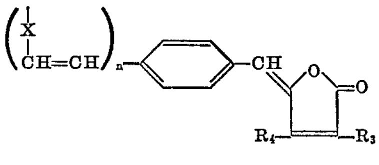

wherein $R_1$ is an aromatic group such as a phenyl group, a phenyl group substituted with such substituents as an alkyl group of 1 to 8 carbon atoms (e.g., methyl, ethyl, propyl, butyl, amyl, hexyl, heptyl, octyl, etc.), an alkoxy group of 1 to 8 carbon atoms (e.g., methoxy, ethoxy, propoxy, butoxy, amyloxy, hexyloxy, heptyloxy, octyloxy, etc.) an alkoxycarbonyl group of 2 to 9 carbon atoms (e.g., methoxycarbonyl, ethoxycarbonyl, propoxycarbonyl, butoxycarbonyl, amyloxycarbonyl, hexyloxycarbonyl, heptyloxycarbonyl, octyloxycarbonyl, etc.), a nitro group, a halogen group (e.g., bromo, chloro, iodo), etc.; a naphthyl group, a naphthyl group substituted with one or more of the above named substituents, a furyl group, a furyl group substituted with one or more of the above-named substituents or with an indenylidenemethyl group; each $R_2$ is a hydrogen atom, an alkyl group of 1 to 8 carbon atoms (e.g., methyl, ethyl, propyl, butyl, amyl, hexyl, heptyl, octyl, etc.) or an alkoxy group of 1 to 8 carbon atoms (e.g., methoxy, ethoxy, propoxy, butoxy, amyloxy, hexyloxy, heptyloxy, octyloxy, etc.); $R_3$ is a cyano group or an alkoxycarbonyl group of 2 to 9 carbon atoms (e.g., methoxycarbonyl, ethoxycarbonyl, propoxycarbonyl, butoxycarbonyl, amyloxycarbonyl, hexyloxycarbonyl, heptyloxycarbonyl, octyloxycarbonyl, etc.); $R_4$ is an aryl group such as phenyl, substituted phenyl, naphthyl, substituted naphthyl, etc.; X is a carbonyloxy linkage, the oxygen atom of which is attached to the polymer backbone, an oxycarbonyl linkage, the carbonyl group of which is attached to the polymer backbone, or an amido linkage; Z is an arylmethylidyne group (e.g., a phenylmethylidyne group); *m* is 0 or 1 and *n* is 0 or 1.

Representative carboxylic acids and alcohols, the derivatives of which can be employed to prepare light-sensitive polymers having the above groups attached to the polymer backbone include:

1-arylmethylene-3-indenecarboxylic acids such as
1-benzylidene-3-indenecarboxylic acid,
1-p-nitrobenzylidene-3-indenecarboxylic acid,
1-p-chlorobenzylidene-3-indenecarboxylic acid,
1-p-methoxybenzylidene-3-indenecarboxylic acid,
1-p-ethoxycarbonylbenzylidene-3-indenecarboxylic acid,
1-p-(2-ethylhexoxy)benzylidene-3-indenecarboxylic acid,
1-furfurylidene-3-indenecarboxylic acid,
1-[5-(3-methoxycarbonyl-1-indenylidenemethyl) furfurylidene]-3-indenecarboxylic acid,
4,7-dimethyl-1-p-isopropylbenzylidene-3-indenecarboxylic acid,
4,7-diethyl-1-p-methoxybenzylidene-3-indenecarboxylic acid,
5,6-dimethoxy-1-p-(2-ethylhexoxycarbonyl) benzylidene-3-indenecarboxylic acid;
1-indenylidenemethylaromatic acids, such as
3-methoxycarbonyl-1-indenylidenemethylbenzoic acid,
3-(2-ethylhexoxycarbonyl)-1-indenylidenemethylbenzoic acid,
3-cyano-1-indenylidenemethylbenzoic acid,
3-methoxycarbonyl-1-indenylidenemethylcinnamic acid,
3-(2-ethylhexoxycarbonyl)-1-indenylidenemethylcinnamic acid,
3-cyano-1-indenylidenemethylcinnamic acid,
p-[4,7-dimethyl-3-(2-ethylhexoxycarbonyl)-1-indenylidenemethyl]benzoic acid,
p-(4,7-dimethyl-3-methoxycarbonyl-1-indenylidenemethyl)cinnamic acid,
p-(5,6-dimethoxy-3-methoxycarbonyl-1-indenylidenemethyl)benzoic acid,
1-arylmethylene-3-indenemethanols, such as,
1-benzylidene-α-phenyl-3-indenemethanol,
1-p-nitrobenzylidene-α-phenyl-3-indenemethanol,
1-p-methoxybenzylidene-α-phenyl-3-indenemethanol,
1-p-(2-ethylhexoxycarbonyl)benzylidene-α-phenyl-3-indenemethanol,
4,7-dimethyl-1-p-isopropylbenzylidene-3-indenecarboxylic acid;
5-arylmethylene-2(5H)-furanone-3-carboxylic acids, such as
5-benzylidene-2(5H)-furanone-3-carboxylic acid,
5-(p-nitrobenzylidene)-4-phenyl-2(5H)-furanone-3-carboxylic acid,
5-(p-ethoxybenzylidene)-2(5H)-furanone-3-carboxylic acid,
5-[p-(2-ethylhexoxy)benzylidene]-2(5H)-furanone-3-carboxylic acid,
5-(p-ethoxycarbonylbenzylidene)-2(5H)-furanone-3-carboxylic acid; and
2(5H)-furanone-5-ylidenemethylaromatic acids, such as
p-(3-methoxycarbonyl-4-phenyl-2(5H)-furanon-5-ylidenemethyl)cinnamic acid,
p-(3-ethoxycarbonyl-4-phenyl-2(5H)-furanon-5-ylidenemethyl)benzoic acid,
p-[3-(2-ethylhexoxycarbonyl)-4-phenyl-2(5H)-furanon-5-ylidenemethyl]cinnamic acid,
p-(3-cyano-4-phenyl-2(5H)-furanon-5-ylidenemethyl)cinnamic acid,
p-(3-cyano-4-phenyl-2(5H)-furanon-5-ylidenemethyl)benzoic acid.

The polymers which form the backbone of the light-sensitive polymers of this invention and to which the light-sensitive moieties are appended include natural and synthetic resins such as hydroxyl-containing polymers, for example, polyvinyl alcohol, polyvinyl alcohol-co-vinyl acetate, polyvinyl alcohol-co-vinyl benzoate, polyvinyl alcohol-co-vinyl acetate-co-vinyl benzoate, polyethers such as epoxy and phenoxy polymers, e.g., the condensation product of a bisphenol, such as diphenylolpropane, with epichlorohydrin, naturally occurring materials such as cellulose, starch, guar, alginic acid, and their partially esterified or etherified derivatives, polyesters of polyhydroxy intermediates such as glycerol and sorbitol which have hydroxyl groups remaining after incorporation in the polymer chain; polymers containing reactive amino groups, for example, aminostyrene and anthranilic acid polymers such as polyvinyl anthranilate; polymers containing reactive anhydride groups such as copolymers of maleic anhydride with ethylene or styrene.

The light-sensitive polymers of the present invention are prepared by reaction of the hydroxy or amino groups on the polymer backbone with an acid halide of the light-sensitive 1 - arylmethyleneindene or 5 - arylmethylene-2(5H)-furanone moiety, or by reaction of the hydroxyl derivatives of the 1-arylmethyleneindene moiety with a polymer containing reactive anhydride groups. This reaction is typically carried out in a tertiary amine solvent such as pyridine, picoline, lutidine, triethylamine, and the like, at room temperature, or at elevated temperatures up to about 100° C.

When the hydroxyl-containing polymer employed is a polyvinyl alcohol, light-sensitive polymers which have good solubility and other desirable physical properties can be prepared by the procedure described in copending Reynolds U.S. patent application Ser. No. 812,380, entitled "A Process for the Preparation of Soluble Polyvinyl esters," filed Apr. 1, 1969 now U.S. Pat. 3,560,465, patented Feb. 2, 1971. The procedure involves swelling the polyvinyl alcohol in a tertiary amine solvent followed by partial esterification with an aroyl chloride such as benzoyl chloride. The partially aroylated polyvinyl alcohol is then esterified with the photo-sensitive acid chloride, after which any remaining hydroxyl groups optionally can be esterified with aroyl chloride.

The light-sensitive 1-arylmethylene indene and 5-arylmethylene-2(5H)-furanone derivatives which are employed in preparing light-sensitive polymers of the present invention can be prepared by the reaction of a 3-indenecarboxylic acid or a 3-furanone carboxylic acid with an aromatic aldehyde. Suitable aromatic aldehydes include benzaldehyde, benzaldehyde substituted with such groups at nitro, alkyl, alkoxy, alkoxycarbonyl, carboxy, chloro, and the like; p-formylcinnamic acid; naphthaldehyde, naphthaldehyde substituted with the above substituents; 2-furaldehyde; substituted furaldehydes; and the like. This reaction is carried out in aromatic hydrocarbon solvents, such as toluene, in the presence of an amine salt, such as piperidine acetate, at elevated temperature in the range of 80 to 140° C. The resulting carboxylic acid can be converted to the acid halide by treatment with a halogenating agent such as oxalyl chloride or thionyl chloride. The hydroxyl derivative of indene can be prepared by condensation of indene with an aromatic aldehyde in alcoholic potassium hydroxide.

In addition to the light-sensitive group, the polymers of this invention can contain non-light-sensitive groups attached to the polymer backbone. Such other groups are often used in modifying the physical properties of the polymer, such as solubility, adhesivity, melting point, and the like. Useful groups include those derived from aliphatic and aromatic carboxylic acids, such as acetic acid, haloacetic acid, propionic acid, isovaleric acid, succinic acid, glutaric acid, adipic acid, sebacic acid, 2-ethylhexanoic acid, decanoic acid, benzoic acid, halobenzoic acids, nitrobenzoic acids, toluic acids, p-ethylbenzoic acid, p-octylbenzoic acid, p-ethoxybenzoic acid, p-amyloxybenzoic acid, 2-naphthoic acid, and the like. These modifying groups can be attached to the polymer prior to addition of the light-sensitive group, for example, when an acetylated polyvinyl alcohol is used as the polymer backbone, or when the procedure of the Reynolds' application, referred to above, is employed to prepare the light-sensitive polymers of this invention. Alternatively, free reactive groups contained on the polymer backbone after addition of the light-sensitive moiety can be esterified with the acid chloride, or other suitable reactants, of these modifying groups. The modifying group can comprise up to 75% of the groups attached to the polymer backbone. Thus, as few as 25% of the groups pendant from the polymer backbone can be light-sensitive groups of the present invention. Preferably, 25 to 85% of the groups attached to the polymer backbone are light-sensitive groups of this invention.

The polymers of the present invention are useful in a variety of photographic applications to prepare photomechanical images such as lithographic printing plates and photoresists.

Coating compositions containing the light-sensitive polymers of this invention can be prepared by dispersing or dissolving the polymer in a suitable organic solvent such as dimethylformamide; ketones such as 4-methyl-2-pentanone, cyclohexanone, etc.; chlorinated hydrocarbon solvents such as chloroform, trichloroethylene, dichloroethane, trichloroethane, tetrachloroethane, etc.; mixtures of these solvents, and the like. Coating compositions can include a variety of photographic addenda utilized for their known purpose, such as agents to modify the flexibility of the coating, agents to modify its surface characteristics, dyes and pigments to impart color to the coating, agents to modify the adhesivity of the coating to the support, and a variety of other addenda known to those skilled in the art.

The coating compositions can be sensitized with such sensitizers as pyrylium and thiapyrylium salts, thiazoles, benzothiazolines, napththothiazolines, quinolizone, Michler's ketone, Michler's thioketone, and the like sensitizers. Because of the wide range of spectral response and high photographic speed of the light-sensitive polymers of the present invention, often it is not necessary, and for some applications not desirable, to incorporate sensitizers in the photosensitive coating composition. If, however, a sensitizer is employed, it can be present in amounts of about 0.005 to 5 percent by weight of the coating composition.

The light-sensitive polymer of this invention can be the sole polymeric constituent of the coating composition or another polymer can be incorporated therein to modify the physical properties of the composition and serve as a diluent. For example, phenolic resins, such as thermoplastic novolac resins, can be incorporated in the composition to improve the resistance of the polymer composition to etchants when it is used as a photoresist. Similarly, hydrophilic polymers such as cellulose and its derivatives, polyalkylene oxides, polyvinyl alcohol and its derivatives, etc., can be incorporated in the composition to improve the hydrophilic properties of the coating when it is used in the preparation of lithographic printing plates. These other polymeric materials can constitute up to 25% by weight, based on the weight of the light-sensitive polymer, of the coating composition.

Photosensitive elements can be prepared by coating the photosensitive compositions from solvents onto supports in accordance with usual practices. Suitable support materials include fiber base materials such as paper, polyethylene-coated paper, polypropylene-coated paper, parchment, cloth, etc.; sheets and foils of such metals as aluminum, copper, magnesium, zinc, etc.; glass and glass coated with such metals as chromium, chromium alloys, steel, silver, gold, platinum, etc.; synthetic polymeric materials such as polyalkyl methacrylates (e.g. polymethyl methacrylate), polyester film base (e.g., polyethylene terephthalate), polyvinyl acetals, polyamides (e.g., nylon), cellulose ester film base (e.g., cellulose nitrate, cellulose acetate, cellulose acetate propionate, cellulose acetate butyrate), and the like. The optimum coating thickness for a particular purpose will depend upon such factors as the use to which the coating will be put, the particular light-sensitive polymer employed, and the nature of other components which may be present in the coating. Typical coating thicknesses can be from about 0.1 to 10 mils.

Photomechanical images can be prepared with photosensitive elements by imagewise exposing the element to a light source to harden or insolubilize the polymer in exposed areas. Suitable light sources which can be employed in exposing the elements include sources rich in visible radiation and sources rich in ultraviolet radiation, such as carbon arc lamps, mercury vapor lamps, fluorescent lamps, tungsten lamps, photoflood lamps, and the like.

The exposed element can be developed with a solvent for the unexposed, uncrosslinked polymer which is a nonsolvent for the exposed hardened polymer. Such solvents can be selected from the solvents listed above as suitable coating solvents, as well as others.

The following examples further illustrate the practice of the present invention.

Example 1.—Preparation of 1-benzylidene-3-indenecarboxylic acid

A mixture of 40.0 g. (0.250 mole) of 3-indenecarboxylic acid, 26.5 g. (0.250 mole) of benzaldehyde, 250 ml. of toluene , 1 ml. of piperidine, and 1 ml. of glacial acetic acid is refluxed for 2 hours with stirring and azeotropic removal of water and then cooled overnight in the refrigerator. The solid is collected, washed with toluene, and dried to give 35.5 g. of brown-yellow crystals, M.P. 222–226° C. Recrystallization from chlorobenzene gives 30.4 g. of orange crystals (49.1 percent), M.P. 224–226° C.

Example 2.—Preparation of 1-p-nitrobenzylidene-3-indenecarboxylic acid 1-p-nitrobenzylidene-3-indenecarboxylic acid is made in 57 percent yield by the above procedure except that p-nitrobenzaldehyde is used instead of benzaldehyde and the recrystallization solvent is dioxane.

Example 3.—Preparation of 1-p-methoxybenzylidene-3-indene carboxylic acid

A solution of 40 g. (0.25 mole) of 3-indenecarboxylic acid and 35 g. (0.26 mole) of p-anisaldehyde in 320 ml. of methanol is treated with 110 ml. of 30 percent potassium hydroxide in methanol. The mixture is allowed to stand overnight in a cold water bath and then is added to 500 ml. of water. Extraction of this mixture with ether, acidification of the aqueous phase, collection of the solid, washing with water, and drying at 60° C. gives 61 g. of product, M.P. 198–200° C. Recrystallization from chlorobenzene gives 41 g. (59 percent) of yellow crystals, M.P. 222° C.

Example 4.—Preparation of methyl 1-p-carboxybenzylidene-3-indenecarboxylate

A mixture of 10.7 g. (0.0713 mole) of p-carboxybenzaldehyde 12.4 g. (0.0713 mole) methyl 3-indenecarboxylate, 1 ml. of piperidine, 1 ml. of glacial acetic acid, and 150 ml. of toluene is refluxed for 2 hours with stirring and azeotropic removal of water. The mixture is cooled overnight in the refrigerator and the solid collected, washed with toluene, and dried at 60° C. to give 19.0 g. of orange crystals, M.P. 250° C. Recrystallization from 350 ml. of dioxane gives 14.2 g. (65.0 percent), M.P. 274–276° C.

*Analysis.*—Calcd. for $C_{19}H_{14}O_4$ (percent): C, 74.5; H, 4.57. Found (percent): C, 74.8; H, 4.7.

Example 5.—Preparation of p-[3-methoxycarbonyl-1-indenylidenemethyl]cinnamic acid p-[3 - methoxycarbonyl-1-indenylidenemethyl]cinnamic acid, M.P. 251–254° C. is made in 68.5 percent yield by the procedure of Example 4 except that p-formylcinnamic acid is used in place of p-formylbenzoic acid.

*Analysis.*—Calcd. for $C_{21}H_{16}O_4$ (percent): C, 75.8; H, 4.82. Found (percent): C, 76.3; H, 5.1.

Example 6.—Preparation of 2-ethylhexyl 3-indenecarboxylate

A solution of 200 g. (1.25 mole) of 3-indenecarboxylic acid, 2 liters of 2-ethyl-1-hexanol, and 5 g. of p-toluenesulfonic acid is distilled slowly through a 6-inch column packed with ¼-inch glass helices for 5 hours, refluxed over night, and then distilled for 4 more hours. During this time the pot temperature rises from 160 to 190° C.; and 26 ml. of water is distilled off. The mixture is concentrated at the water pump and the residue dissolved in 1 liter of petroleum ether (B.P. 35–60° C.) and allowed to stand overnight. The filtered solution is washed with 500 ml. of water, 200 ml. of saturated aqueous sodium bicarbonate, and again with 500 ml. of water. Drying over anhydrous sodium sulfate, concentration at the water pump and fractionation of the residue gives 12.2 of forerun, B.P. 128–181° C. (1 mm.), 143 g. of pale yellow oil, B.P. 165–166° C. (1 mm.), $n_D^{20}$ 1.5195 and 64.5 g. B.P. 165–169° C (1 mm.) $n_D^{21.5}$ 1.5186. The yield of 207.5 g. is 61.0 percent of the theoretical quantity.

*Analysis.*—Calcd. for $C_{18}H_{24}O_2$ (percent): C, 79.4; H, 8.83. Found (percent): C, 79.4; H, 8.4.

Example 7.—Preparation of p-[3-(2-ethylhexoxycarbonyl)-1-indenylidenemethyl]cinnamic acid A mixture of 198 g. (0.728 mole) of 2-ethylhexyl 3-indenecarboxylate prepared in Example 6, 128 g. (0.728 mole) of p-formylcinnamic acid, 1 liter of toluene, 3 ml. of piperidine and 3 ml. of glacial acetic acid is refluxed for 24 hours with stirring and azeotropic removal of water. The hot solution is gravity filtered and the filtrate is cooled overnight in the refrigerator. The solid is collected, boiled with 3 liters of acetonitrile, chilled overnight, and again collected and dried to give 171.3 g. (54.8 percent) of orange product, M.P. 147.5–150° C.

*Analysis.*—Calcd. for $C_{28}H_{30}O_4$ (percent): C, 78.2; H, 6.98. Found (percent): C, 77.9; H, 6.9.

Example 8.—Preparation of 1-benzylidene-3-indenecarbonyl chloride

To a mixture of 30.4 g. (0.114 mole) of 1-benzylidene-3-indenecarboxylic acid prepared in Example 1, 200 ml. of benzene, and 1 ml. of dimethylformamide is added dropwise with stirring 31.8 g. (0.251 mole) of oxalyl chloride. After completion of the addition the mixture is stirred for 15 minutes at room temperature and then for 2 hours on the steam bath. The solution is cooled to room temperature, filtered from a small amount of tar, diluted with 200 ml. of ligroine (B.P. 63–75° C.), and cooled overnight in the refrigerator. The solid is collected to give 22.4 g. of brown-yellow crystals, M.P. 113–121° C. Recrystallization from 200 ml. of cyclohexane gives 19.2 g. (6.32 percent) of orange crystals, M.P. 119–122° C.

*Analysis.*—Calcd. for $C_{17}H_{11}ClO$ (percent): C, 76.5; H, 4.13; Cl, 13.3. Found (percent): C, 76.2; H, 4.4; Cl, 13.5.

Example 9.—Preparation of methyl 1-[p-(2-chlorocarbonylvinyl)-benzylidene]-3-indenecarboxylate Methyl 1-[p-(2 - chlorocarbonylvinyl)benzylidene]-3-indene carboxylate is made by the procedure of Example 8 from p-(3-methoxycarbonyl-1-indenylidenemethyl)cinnamic acid prepared in Example 5 and oxalyl chloride (10 percent excess) in 57 percent yield, M.P. 148–151° C. after recrystallization from benzene.

*Analysis.*—Calcd. for $C_{21}H_{15}ClO_3$ (percent): C, 71.8; H, 4.29; Cl, 10.1. Found (percent): C, 72.1; H, 4.5; Cl, 10.3.

Example 10.—Preparation of methyl 1-p-chlorocarbonylbenzylideneindene-3-carboxylate, 1-p-methoxybenzylidene-3-indenecarbonyl chloride and 1-p-nitrobenzylidene-3-indenecarbonyl chloride Methyl 1 - p - chlorocarbonylbenzylideneindene-3-carboxylate, 1-p-methoxybenzylidene-3-indenecarbonyl chloride, and 1-p-nitrobenzylidene-3-indenecarbonyl chloride are made by treatment of the appropriate acids from Examples 4, 3 and 2 with 10 percent excess of oxalyl chloride by the procedure described above except that it is not necessary to dilute with ligroine in order to get the products to crystallize.

Example 11.—Preparation of p-[3-(2-ethylhexoxycarbonyl)-1-indenylidenemethyl]cinnamoyl chloride p - [3-(2-ethylhexoxycarbonyl)-1-indenylidenemethyl] cinnamoyl chloride is made from the corresponding acid prepared in Example 7 and oxalyl chloride by the above procedure except that after completion of the reaction the solution is concentrated at the water pump. Slurrying the residue with ligroine (B.P. 63–75° C.) gives a solid which is collected and recrystallized from the same solvent to give the orange, crystalline product, M.P. 59–61° C. in 75 percent yield.

*Analysis.*—Calcd. for $C_{28}H_{29}ClO_3$ (percent): C, 74.9; H, 6.46; Cl, 7.92. Found (percent): C, 74.8; H, 6.2; Cl, 8.2.

Example 12.—Preparation of copoly[vinyl acetate-co-vinylbenzoate-co-vinyl 1-benzylidene - 3 - indenecarboxylate]

A mixture of 5.0 g. (0.10 mole) of a medium molecular weight, 12 percent acetylated poly(vinyl alcohol) (Elvanol 52–22 sold by Du Pont) and 200 ml. of pyridine (dried over Linde molecular sieve, 3A powder) is stirred overnight on the steam bath, cooled to room temperature and treated with 16.5 g. (0.0618 mole) of 1-benzylidene-3-indenecarbonyl chloride prepared in Example 8. The mixture is stirred for 15 minutes without heating and then for 2 hours at 50° C. It is then cooled to 25° C., treated with 7 g. (0.05 mole) of benzoyl chloride and heated 1 hour at 50° C. Cooling to room temperature, precipitation in water, leaching overnight in fresh water, collection of the solid and drying to constant weight in a vacuum desiccator over anhydrous calcium chloride gives 21.8 g. of pale yellow product (hereafter identified as Polymer 1). Similarly, copoly(vinyl acetate-co-vinyl benzoate-co-vinyl-1-p-methoxybenzylidene - 3 - indenecarboxylate) (Polymer 2) and copoly(vinyl acetate-co-vinyl benzoate-co-vinyl 1-p-nitrobenzylidene-3-indenecarboxylate) (Polymer 3) are made by esterification of Elvanol 52–22 with appropriate acid chlorides of Example 10 by this procedure.

Example 13.—Sensitometric data

Solutions containing 2 percent of the polymers of Example 12 in dichloroethane are coated and evaluated to give the sensitometric data in Tables 1 and 2. The photographic speed and spectral response of the polymers is determined by the procedure of L. M. Minsk et al. "Photosensitive Polymers, I and II" Journal of Applied Polymer Science; vol. II, No. 6, pp. 302–311 (1959). The sensitivity value is a measure of the relative speed of the polymer, when exposed to ultraviolet or visible light, compared with the speed of unsensitized polyvinyl cinnamate as a standard. The coating and developing solvents used in this and subsequent examples are identified as follows:

DCE—1,2-dichloroethane
$T_3CE$—trichloroethane
$T_4CE$—tetrachloroethane
MEK—methyl ethyl ketone
DMF—N,N-dimethylformamide
CHX—cyclohexanone The sensitizers employed in this and subsequent examples are present in concentrations of 0.2 percent by weight, and are identified as follows:

(A) 2,6-bis(p-ethoxyphenyl) - 4 - (p-n-amyloxyphenyl) thiapyrylium perchlorate
(B) 2-benzoylmethylene-1-methyl - β - naphthothiazoline
(C) 4-H-quinolizine-4-thione
(D) methyl 3-methyl-2-benzothiazolidinedithioacetate
(E) 6-dimethylamino-4-methylcoumarin
(F) erythrosin
(G) 1,2-benzanthraquinone

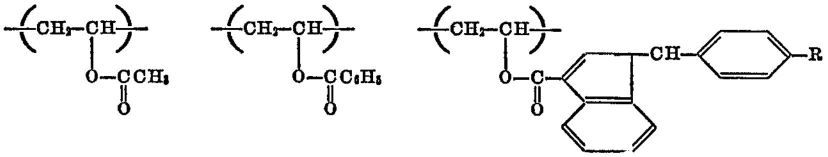

TABLE 1.—SENSITIVITY VALUE FOR POLYMERS OF THE TYPE

| | R | Mole percent light-sensitive ester | Coating and developing solvent | Sensitivity value using sensitizer: [1] None [1] | A | B | C | D | E |
|---|---|---|---|---|---|---|---|---|---|
| Polymer: | | | | | | | | | |
| 1 | H | 62 | DCE | 1,600 | 2,200 | 740 | 1,600 | | |
| 2 | $CH_3O$ | 44 | DCE | 250 | 170 | 170 | 170 | 250 | |
| 3 | $NO_2$ | 50 | $T_4CE$ | 500 | 760 | 350 | 1,100 | 1,100 | 120 |

[1] Control.

TABLE 2

Spectral response in mμ

| Sensitizer | Polymer 1 | 2 | 3 |
|---|---|---|---|
| (None) Control | 260–520 | 340–490 | 275–525 |
| A | 260–590 | 350–490 | 270–570 |
| B | 260–515 | 340–490 | 280–525 |
| C | 260–540 | 350–490 | 280–580 |
| D | | 340–490 | 285–570 |
| E | | | 300–570 |

Example 14

Esterification of Elvanol 52–22 by the procedure of Example 12 with methyl 1-p-chlorocarbonylbenzylidene-indene-3-carboxylate or with methyl 1-[p-(2-chlorocarbonylvinyl)benzylidene]-3-indenecarboxylate, prepared in Examples 9 and 10, gives similar light-sensitive polymers 4 to 9. Polymers with improved solubility result from use of the 2-ethylhexyl esters in place of the methyl esters. Descriptions of the polymers and sensitometric data appear in Tables 3, 4 and 5.

TABLE 3

Polymers of the type

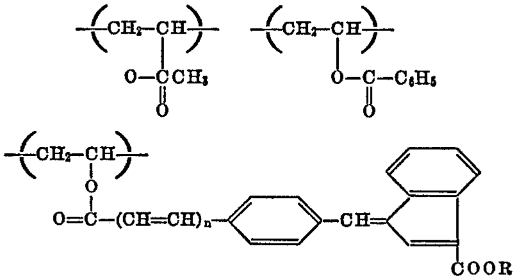

| Polymer | R | n | Mole percent of — Acetate | Benzoate | Light-sensitive ester |
|---|---|---|---|---|---|
| 4 | CH | 0 | 12 | 60 | 28 |
| 5 | $CH_3$ | 1 | 12 | 61 | 27 |
| 6 | $C_2H_5$—CH(n—$C_4H_9$)—$CH_2$— | 1 | 12 | 63 | 25 |
| 7 | Same as above | 1 | 12 | 38 | 50 |
| 8 | do | 1 | 12 | 13 | 75 |
| 9 | do | 1 | 12 | 0 | 88 |

TABLE 4

Sensitivity value of the polymers described in Table 3

| Polymer | Coating and developing solvent | Sensitivity value using sensitizer None [1] | A | B | C | D | E | F |
|---|---|---|---|---|---|---|---|---|
| 4 | DCE | 56 | 1,100 | 180 | 760 | | | |
| 5 | DCE | 350 | 1,600 | 350 | 1,600 | 2,200 | 300 | |
| 6 | DCE | 320 | 450 | 320 | 500 | | | |
| 7 | DCE | 25,000 | 5,600 | 7,900 | 16,000 | 7,900 | | 11,000 |
| 8 | DCE | 790 | 2,200 | 1,100 | | 1,600 | | |
| 9 | $T_3CE$ | 22 | 140 | 45 | | 200 | | |

[1] Control.

TABLE 5

Spectral response in mμ

| Sensitizer | Polymer 4 | 5 | 6 | 7 | 8 | 9 |
|---|---|---|---|---|---|---|
| (None) Control | 350–460 | 300–350 | 380–460 | 270–500 | 270–490 | |
| A | 300–575 | 280–590 | 380–520 | 270–570 | 270–550 | 270–540 |
| B | 340–470 | 305–535 | 380–460 | 270–470 | 270–500 | |
| C | 270–530 | 265–560 | 380–470 | 270–500 | | |
| D | | 265–560 | | 270–510 | 270–520 | 270–490 |
| E | | 300–520 | | | | |
| F | | | | 270–550 | | |

Example 15.—Preparation of copoly[2-(1-benzylidene-3-indene-carbonyloxy)trimethylene - 2,2-bis(4-oxyphenyl)propane; 2(benzoyloxy)trimethylene-2,2-bis(4-oxyphenyl)propane]

A solution of 17.0 g. (0.0599 mole) of "Phenoxy Resin" (Union Carbide PRDA 8030) in 150 ml. of dry pyridine is treated with 8.0 g. (0.030 mole) of 1-benzylidene-3-indenecarbonyl chloride prepared in Example 8, stirred for ½ hour without heating and then for 1 hour at 50–60° C. After being cooled to room temperature the solution is treated with 4.6 g. (0.033 mole) of benzoyl chloride, stirred for 15 minutes without heating, then for 1 hour at 50–60° C., and then cooled to room temperature. The product is isolated by precipitation in water and dried to constant weight in a vacuum desiccator over anhydrous calcium sulfate. The yield is 22.1 g. of pale yellow powder (Polymer 10). Treatment of the "Phenoxy Resin" with an equimolar quantity of 1-benzylidene-3-indenecarbonyl chloride prepared in Example 8 by this procedure (except that the benzoyl chloride is omitted) gives poly[2-(1-benzylidene-3-indenecarbonyloxy)trimethylene - 2,2-bis(4-oxyphenyl)propane], (Polymer 11). Similar treatment with p-[3-(2-ethylhexoxycarbonyl) - 1 - indenylidenemethyl] cinnamoyl chloride prepared in Example 11 gives poly {{2-{p-[3 - (2 - ethylhexoxycarbonyl)indenylidenemethyl]cinnamoyloxy}trimethylene - 2,2 - bis(4 - oxyphenyl) propane}}, Polymer 12. Sensitometric data for these polymers are given in Table 6.

brown solution is added slowly with manual stirring to 2 liters of water. The mixture is filtered. Acidification of the milky filtrate with concentrated hydrochloric acid gives a pale yellow solid which is collected and vacuum dried to give 17.0 g. of yellow product, $$\lambda_{max.}^{DMF}\ 286,\ 345\ nm.$$

In addition to the carbocyclic aromatic aldehydes, heterocyclic aromatic aldehydes will condense with 3-indenecarboxylic acid to give intermediates which when converted to acid chlorides can be used to prepare light-sensitive polymers. Examples 17 through 22 show the preparation of such polymers and of the intermediates used to make them.

Example 17.—1-furfurylidene-3-indenecarboxylic acid

A mixture of 32.0 g. (0.200 mole) of 3-indenecarboxylic acid, 19.2 g. (0.200 mole) of 2-furaldehyde, 200 ml. of toluene, 1 ml. of glacial acetic acid, and 1 ml. of piperidine is refluxed for 3 hours with stirring and azeotropic

TABLE 6

Sensitivity values for polymers of the type

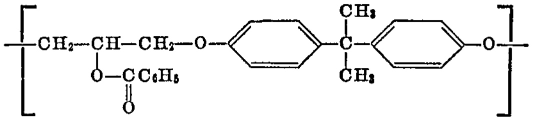

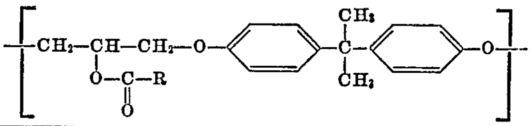

| Polymer | R | Coating and developing solvent | Mole Percent R | Mole Percent Benzoate | Sensitivity value with sensitizer None [1] | A | B | C |
|---|---|---|---|---|---|---|---|---|
| 10 | 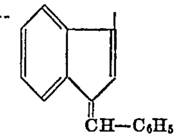 | DCE | 50 | 50 | 11 | 45 | 14 | 63 |
| 11 | 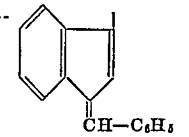 | DCE | 100 | 0 | 45 | 89 | 45 | 63 |
| 12 | 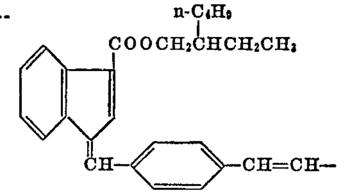 | DCE | 100 | 0 | 13 | 45 | 23 | 130 |

[1] Control

Example 16.—Copoly[ethylene-α-(1-benzylidene-3-indenyl)benzyl hydrogen maleate]

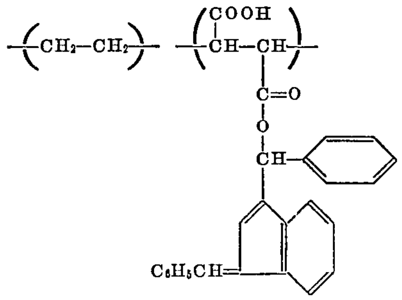

To a solution of 14.9 g. (0.0500 mole) of 1-benzylidene-α-phenyl-3-indenemethanol in 100 ml. of dry pyridine is added 6.3 g. (0.050 mole) of a medium viscosity, medium molecular weight ethylene-maleic anhydride copolymer (Monsanto Grade 21). The mixture is stirred overnight at room temperature and then on a steam bath for 1 hour. After cooling to room temperature the orange removal of 3.0 ml. of water. The solid which separates upon cooling to room temperature is recrystallized from 250 ml. of dioxane to give 23.7 g. (49.8 percent) of orange crystals, M.P. 246–254° C.

*Analysis.*—Calcd. for $C_{15}H_{10}O_3$ (percent): C, 75.6; H, 4.20. Found (percent): C, 75.3; H, 4.4.

Similar treatment of 29.2 g. (0.304 mole) of 2-furaldehyde with 52.8 g. (0.304 mole) of methyl 3-indenecarboxylate gives after 3 recrystallizations from methanol 50.4 g. (65.8 percent) of orange crystalline methyl 1-furfurylidene-3-indenecarboxylate, M.P. 98.5–100° C.

*Analysis.*—Calcd. for $C_{16}H_{12}O_3$ (percent): C, 76.2; H, 4.76. Found (percent): C, 75.9; H, 5.0.

Example 18.—Methyl 1-(5-formylfurfurylidene)-3-indenecarboxylate

To 100 ml. of dimethylformamide is added, with stirring and cooling to keep the temperature below 30° C., 7.7 g. (0.050 mole) of phosphoryl chloride followed by 12.6 g. (0.0500 mole) of methyl 1-furfurylidene-3-indenecarboxylate. The mixture is stirred for 1 hour without heating and then for 1 hour at 70° C., chilled in ice, and made basic by slow addition of 2 N potassium hydroxide. The solid is collected, washed with water, and recrystallized 4 times from acetonitrile to give 4.6 g. (33 percent) of orange crystals, M.P. 157–158.5° C.

*Analysis.*—Calcd. for $C_{17}H_{12}O_4$ (percent): C, 72.7; H, 4.28. Found (percent): C, 72.9; H, 4.2.

When the reaction is run as described above with twice the amount of material, and the potassium hydroxide treatment is omitted, a red-brown crystalline solid separates after stirring overnight at room temperature. It is collected, washed with ether, and air dried to give 25.4 g. which liquefies at 100° C., resolidifies, and melts at 151–155° C. This Vilsmeier product gives methyl 1-(5-formylfurfurylidene) - 3 - indenecarboxylate when treated with alcohols and condenses with active methylene compounds to give products identical with those from 1-(5-formylfururylidene)-3-indenecarboxylate.

Example 19.—Methyl 1-[5-(3-carboxy-1-indenylidenemethyl)furfurylidene]-3-indenecarboxylate A mixture of 25.0 g. of the Vilsmeir product from the preceding example, 11.6 g. (0.0728 mole) of 3-indenecarboxylic acid, and 200 ml. of methanol is warmed until solution results, treated with 1 ml. of piperidine, and allowed to stand for 72 hours. The solid is collected, washed with methanol, and recrystallized twice from dioxane to give 11.9 g. (39.8 percent) of brown crystals, M.P. 272.5–273.5° C.

*Analysis.*—Calcd. for $C_{26}H_{18}O_5$ (percent): C, 76.8; H, 4.38. Found (percent): C, 76.8; H, 4.6.

Example 20.—1-[5-(3-methoxycarbonyl-1-indenylidenemethyl)furfurylidene]-3-indenecarbonyl chloride To a mixture of 8.6 g. (0.0200 mole) of methyl 1-[5-(3 - carboxy - 1-indenylidenemethyl)furfurylidene]-3-indeneocarboxylate, 1 ml. of DMF, and 100 ml. of benzene is added dropwise with stirring 2.8 g. (0.022 mole) of oxalyl chloride. The mixture is stirred for 1 hour without heating and then for 1 hour on a steam bath. After cooling to room temperature the solid is collected, washed with benzene, and recrystallized from dioxane to give 5.2 g. (60 percent) of shiny red-brown crystals, M.P. 218–220° C.

*Analysis.*—Calcd. for $C_{26}H_{17}ClO_4$ (percent): C, 72.8; H, 3.96; Cl, 8.34. Found (percent): C, 72.6; H, 4.3; Cl, 8.1.

Similar treatment of 15.3 g. (0.0643 mole) of 1 - furfurylidene-3-indenecarboxylic acid in 200 ml. of benzene containing 1 ml. of DMF with 9.0 g. (0.071 mole) of oxalyl chloride, dilution of the reaction mixture with 800 ml. of ligroine (B.P. 66–75° C.), collection of the solid which separates upon standing overnight, and recrystallization from 600 ml. of cyclohexane gives 7.3 g. (44.2 percent) of 1-furfurylidene-3-indenecarbonyl chloride as orange threads, M.P. 111–116° C.

*Analysis.*—Calcd. for $C_{15}H_9ClO_2$ (percent): C, 70.0; H, 3.50; Cl, 13.8. Found (percent): C, 70.2; H, 3.8; Cl, 13.9.

Example 21.—Copoly(vinyl acetate-vinyl 2-ethylhexanoate-vinyl 1-furfurylidene-3-indenecarboxylate

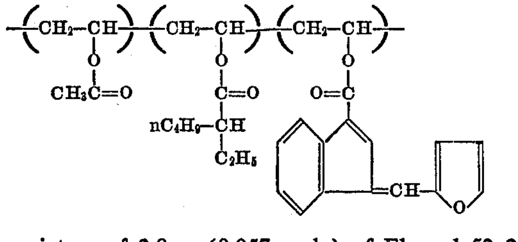

To a mixture of 2.8 g. (0.057 mole) of Elvanol 52–22 in 100 ml. of pyridine which has been stirred overnight on a steam bath and then cooled to room temperature is added 2.3 g. (0.014 mole) of 2-ethylhexanoyl chloride. The mixture is stirred for 2 hours, treated with a slurry of 7.3 g. (0.028 mole) of 1-furfurylidene-3-indenecarbonyl chloride, prepared by reacting the product of Example 17 with oxalyl chloride, in 60 ml. of 1,2-dichloroethane, stirred 2 hours, treated with 2.5 g. (0.015 mole) of 2-ethylhexanoyl chloride, and then stirred overnight. The viscous mixture is filtered and the polymer precipitated by slow addition of the filtrate to 3 liters of water with manual stirring. After decantation of the liquid the solid phase is slurried in 150 ml. of methanol, collected, and vacuum dried to give 3.3 g. of orange granules, $\lambda_{max.}^{DMF}$ 309, 324, 338, 402 nm.

| Sensitizer | Sensitivity value | Coating and developing solvent |
|---|---|---|
| Control | 2,500 | DMF |
| A | 4,500 | DMF |
| B | 2,500 | DMF |
| C | 2,500 | DMF |

Example 22—Copoly{vinyl acetate-vinyl 2-ethylhexanoate-vinyl 1-[5-(3-methoxycarbonyl-1-indenylidenemethyl)furfurylidene]-3-indenecarboxylate}

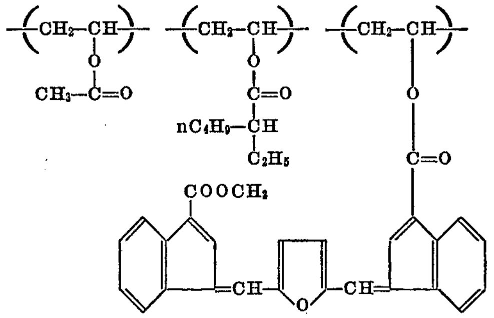

The procedure of Example 21 is followed using 1.2 g. (0.024 mole) of Elvanol 52–22 in 60 ml. of pyridine with successive additions of 1.0 g. (0.0060 mole) of 2-ethylhexanoyl chloride, a slurry of 5.2 g. (0.012 mole) of 1 - [5 - (3 - methoxycarbonyl - 1 - indenylidenemethyl) furfurylidene] - 3 - indenecarbonyl chloride in 50 ml. of 1,2 - dichloroethane, and then 1.5 g. (0.0092 mole) of 2-ethylhexanoyl chloride. The polymer is precipitated from the filtered reaction solution by slow addition to 200 ml. portions of methanol in a blender to give 5.4 g. of red-brown solid, $\lambda_{max.}$ $ClCH_2Cl$ 371, 503 nm.

| Sensitizer | Sensitivity value | Coating and developing solvent |
|---|---|---|
| Control | 2,500 | DCE |
| A | 4,000 | DCE |
| B | 2,500 | DCE |
| G | 2,500 | DCE |

The substituted indenes as well as indene itself can be used as starting materials for the light-sensitive polymers of this invention. Examples 23 through 28 describe the preparation of such polymers and the intermediates used to make them.

Example 23.—4,7-dimethyl-3-indenecarboxylic acid

To a solution of 144 g. (1.00 mole) of 4,7-dimethylindene in 500 ml. of ether is added dropwise with stirring at −30° C. under nitrogen a solution of n-butyllithium from 21.5 g. of lithium and 171 g. of 1-bromobutane (made by the procedure described in Gilman, Organic Reactions, vol. VI, page 352). The mixture is stirred for 10 minutes after completion of the addition and then poured onto 1500 g. of crushed Dry Ice under 500 ml. of ether. The mixture is warmed to 5° C. on a steam bath and extracted 4 times with a total of 2 liters of water. Acidification of the combined aqueous portions, collection of the solid, and recrystallization from 4 liters of benzene gives 104 g. (55.4 percent) of colorless crystals, M.P. 182–183.5° C.

*Analysis.*—Calcd. for $C_{12}H_{12}O_2$ (percent): C, 76.6; H, 6.38. Found (percent): C, 76.0; H, 6.6.

Example 24.—Methyl 4,7-dimethyl-3-indenecarboxylate

A solution of 100 g. (0.532 mole) of 4,7-dimethyl-3-indenecarboxylic acid, 2 liters of methanol and 4 g. of p-toluenesulfonic acid is refluxed overnight, concentrated at the water pump, and then diluted with 500 ml. of ligroine (B.P. 35–60° C.) and chilled. After filtration from a trace of solid the solution is washed with 100 ml. of water, 100 ml. of 9 percent aqueous sodium bicarbonate, and then 100 ml. of water, dried with anhydrous sodium sulfate, and concentrated on a steam bath. Distillation of the residue gives 65.3 g. (60.8 percent of yellow oil, B.P. 165–174° C.) (10 mm.), $n_D^{26}$ 1.5506.

*Analysis.*—Calcd. for $C_{13}H_{14}O_2$ (percent): C, 77.2; H, 6.9. Found (percent): C, 76.9; H, 6.9.

Example 25.—4,7-dimethyl-1-p-isopropylbenzylidene-3-indenecarboxylic acid

The procedure of Example 1 is followed using 29.0 g. (0.154 mole) of 4,7-dimethyl-3-indenecarboxylic acid, 22.8 g. (0.154 mole) of p-isopropylbenzaldehyde, 200 ml. of toluene, 1 ml. of piperidine, and 1 ml. of glacial acetic acid. Concentration at the water pump and recrystallization of the residue from benzene gives 11.7 g. (23.9 percent) of orange crystals, M.P. 185–187° C.

*Analysis.*—Calcd. for $C_{22}H_{22}O_2$ (percent): C, 82.9; H, 6.9. Found (percent): C, 82.8; H, 6.6.

Similar treatment of 45.8 g. (0.227 mole) of methyl 4,7-dimethyl-3-indenecarboxylate in 500 ml. of toluene with 40.0 g. (0.227 mole) of p-formylcinnamic acid, collection of the solid which separates upon cooling, and recrystallization from 400 ml. of glacial acetic acid gives 37.7 g. (46.2 percent) of yellow p-(4,7-dimethyl-3-methoxycarbonyl-1-indenylidenemethyl)cinnamic acid, M.P. 185–188° C.

Example 26.—4,7-dimethyl-1-p-isopropylbenzylidene-3-indenecarbonyl chloride

To a solution of 12.0 g. (0.0377 mole) of 4,7-dimethyl-1-p-isopropylbenzylidene-3-indenecarboxylic acid, 2 ml. of DMF, and 100 ml. of benzene is added dropwise with stirring 4.75 g. (0.0377 mole) of oxalyl chloride. After completion of the addition the solution is stirred for 1 hour at room temperature and then for 1 hour on a steam bath and then concentrated at the water pump. The yellow solid residue weighed 10.3 g. (81.2 percent). Similar treatment of 20.0 g. (0.0550 mole) of p-(4,7-dimethyl-3-methoxycarbonyl-1-indenylidenemethyl)cinnamic acid in 250 ml. of toluene with 7.62 g. (0.0600 mole) of oxalyl chloride gives upon cooling to room temperature, dilution with 200 ml. of ligroine (B.P. 66–75° C.), and collection of the separated solid, 13.2 g. (63.4 percent) of yellow crystalline p-(4,7-dimethyl-3-methoxycarbonyl-1-indenylidenemethyl)cinnamoyl chloride, M.P. 225–240° C.

Example 27.—Copoly(vinyl acetate-vinyl 4,7-dimethyl-1-p-isopropylbenzylidene-3-indenecarboxylate - vinyl 2-ethylhexanoate)

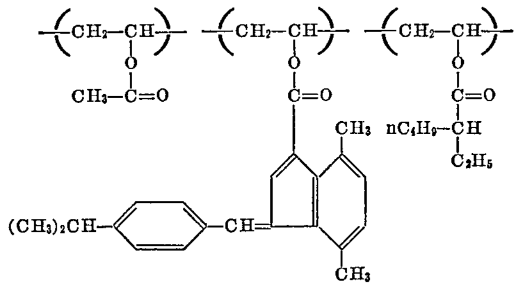

To a mixture of 3.07 g. (0.0614 mole) of Elvanol 52–22 in 150 ml. of pyridine which has been stirred overnight on a steam bath and cooled to room temperature is added 10.3 g. (0.0307 mole) of 4,7-dimethyl-1-p-isopropylbenzylidene-3-indenecarbonyl chloride. The mixture is stirred for ½ hour at room temperature and then 3 hours at 45–55° C. It is cooled to room temperature, treated with 5.3 g. (0.033 mole) of 2-ethylhexanoyl chloride, stirred for ½ hour at room temperature, and then for 2 hours at 45–55° C. The mixture is cooled to room temperature and added slowly to 200 ml. portions of methanol in a blender. The precipitated polymer is collected, washed with methanol, and vacuum dried to give 9.5 g. of yellow powder, $\lambda_{max.}^{ClCH_2CH_2Cl}$ 311, 378 nm.

Example 28.—Copoly[vinyl acetate-vinyl p-(4,7-dimethyl-3-methoxycarbonyl - 1 - indenylidenemethyl)cinnamate-vinyl 2-ethylhexanoate]

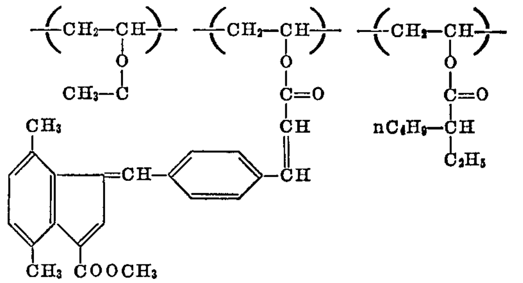

To a mixture of 5.0 g. (0.10 mole) of Elvanol 52–22 and 300 ml. of pyridine which has been stirred overnight on a steam bath and then cooled to room temperature is added 5.0 g. (0.031 mole) of 2-ethylhexanoyl chloride. The mixture is stirred for 1 hour, treated with a solution of 17.2 g. (0.0455 mole) of p-(4,7-dimethyl-3-methoxycarbonyl-1-indenylidenemethyl)cinnamoyl chloride in 150 ml. of 1,2-dichloroethane, stirred for 1 hour, treated with 4.0 g. (0.025 mole) of 2-ethylhexanoyl chloride, and stirred overnight. The polymer is isolated from the filtered reaction mixture by precipitation in methanol using a blender, collection, and vacuum drying to give 20.2 g. of orange solid $\lambda_{max.}^{ClCH_2CH_2Cl}$ 318, 388 nm.

| Sensitizer | Sensitivity value | Coating and developing solvent |
|---|---|---|
| Control | 89 | DCE |
| A | 250 | DCE |
| B | 110 | DCE |
| G | 110 | DCE |

Example 29.—Preparation of 3-methoxycarbonyl-5-[p-(2-carboxyvinyl)benzylidene]-4-phenyl-2(5H)-furanone A solution of 30 g. (0.138 mole) of 3-methoxycarbonyl-4-phenyl-2(5H)-furanone, 24.2 g. (0.138 mole) of p-formylcinnamic acid, 0.5 ml. acetic acid, and 1.5 ml. piperidine in 250 ml. of toluene is refluxed with stirring in a flask attached to a Dean Stark trap for 1.5 hours during which time 2.3 ml. of water is collected. The mixture is cooled, the solid collected by filtration and recrystallized twice from 300 ml. portions of dioxane to yield 32.4 g. of 5 - [p-(2-carboxyvinyl)benzylidene]-3-methoxycarbonyl-4-phenyl-2(5H)-furanone melting at 252–4° C.

*Analysis.*—Calcd. for $C_{22}H_{16}O_6$ (percent): C, 70.3; H, 4.3. Found (percent): C, 69.8; H, 4.8.

Example 30.—Preparation of 5 - [p-(2-chlorocarbonyl)benzylidene] - 3 - methoxycarbonyl-4-phenyl-2(5H)-furanone To a suspension of 27.8 g. (0.074 mole) of 5-[p-(2-carboxyvinyl)benzylidene]-3-methoxycarbonyl - 4 - phenyl-2(5H)-furanone, prepared as described in Example 29, in 150 ml. of benzene and 1 ml. of dimethylformamide is added dropwise with stirring 10.4 g. (0.0814 mole) of oxalyl chloride. The mixture is stirred for one hour at room temperature and then heated at reflux for one hour, during which time a solution results. The solution is diluted with an equal volume of ligroine and cooled to 10° C. The solid is separated by filtration, and recrystallized from 125 ml. of acetonitrile to yield 10.1 g. melting at 247–254° C.

*Analysis.*—Calcd. for $C_{22}H_{15}ClO_5$ (percent): C, 67.0; H, 3.84; Cl, 9.0. Found (percent): C, 67.4; H, 4.3; Cl, 8.6.

Example 31.—Preparation of 5-(p-chlorocarbonylbenzylidene)-3-cyano-4-phenyl-2(5H)-furanone To a suspension of 20.8 g. (0.0656 mole) of 5-(p-carboxybenzylidene)-3-cyano-4-phenyl-2(5H) - furanone in 150 ml. of benzene and 1 ml. of dimethylformamide is added dropwise with stirring, at room temperature, 9.2 g. (0.072 mole) of oxalyl chloride. The mixture is stirred for 1 hour at room temperature and then for 1 hour at reflux at which time a solution resulted. The solution is filtered and cooled, and then the solid separated by filtration to yield 13.1 g. melting at 183–186° C.

*Analysis.*—Calcd. for $C_{19}H_{10}ClNO_3$ (percent): C, 68.1; H, 3.0; Cl, 10.6; N, 4.1. Found (percent): C, 67.8; H, 3.0; Cl, 10.5; N, 4.1.

Example 32.—Preparation of 5-[p-(2-chlorocarbonylvinyl)benzylidene]-3-cyano-4-phenyl-2(5H)-furanone

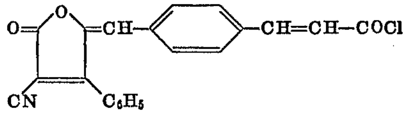

To a suspension of 25.3 g. (0.0738 mole) of 5-[p-(2-carboxyvinyl)benzylidene]-3-cyano - 4 - phenyl-2(5H)-furanone in 250 ml. of o-dichlorobenzene and 2 ml. of dimethylformamide is added dropwise with stirring at room temperature 10.3 g. (0.0812 mole) of oxalyl chloride. The mixture is stirred for 1 hour at room temperature and then is heated on a steam bath for 1 hour. The mixture is filtered hot and the filtrate cooled to room temperature. The solid is collected by filtration. Yield 9.8 g., M.P. 229–232° C.

*Analysis.*—Calcd. for $C_{21}H_{12}ClNO_3$ (percent): C, 69.8; H, 3.4; N, 3.9; Cl, 9.8. Found (percent): C, 68.2; H, 3.6; N, 4.4; Cl, 10.3.

Example 33.—Preparation of copoly[vinyl acetate-vinyl benzoate-vinyl p-(3-methoxycarbonyl-4-phenyl-2(5H)-furanone-5-ylidenemethyl)cinnamate]

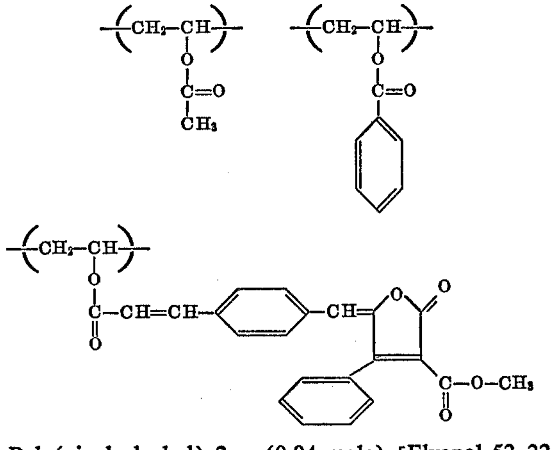

Poly(vinyl alcohol) 2 g. (0.04 mole) [Elvanol 52-22, a 12 percent acetylated, medium viscosity poly(vinyl alcohol), sold by Du Pont] is soaked in 80 ml. of dry pyridine on a steam bath for about 16 hours. The suspension is cooled to room temperature, and 1.4 g. (0.01 mole) of benzoyl chloride is added. The mixture is heated for 1 hour at 50° C., cooled to room temperature, and to it is added 7.9 g. (0.02 mole) of 5-[p-(2-chlorocarbonylvinyl) benzylidene]-3-methoxycarbonyl - 4 - phenyl - 2 - (5H)-furanone prepared as described in Example 30. A slightly exothermic reaction results. The mixture is stirred for 15 minutes, heated at 50° C. for 1 hour, and cooled to 35° C. An additional 1.7 g. (0.012 mole) of benzoyl chloride is added, and the mixture again heated for one hour at 50° C., then allowed to stand without heating for about 16 hours. The mixture is poured into 800 ml. of water with vigorous stirring to precipitate the polymer. The solid is collected by filtration, washed twice with gentle stirring in 1 liter portions of water and dried for 48 hours in a vacuum desiccator to yield 10.7 g. of yellow powder.

| Sensitizer | Sensitivity value | $\lambda_{max.}$ (nm.) | Coating solvent | Developing solvent |
|---|---|---|---|---|
| None | 5,600 | 382 | CHX | MEK |
| A | 4,000 | 560 | CHX | MEK |
| B | 5,600 | 520 | CHX | MEK |
| C | 7,900 | 540 | CHX | MEK |
| D | 2,500 | 520 | CHX | MEK |

Example 34.—Preparation of copoly[vinyl acetate-vinyl isovalerate vinyl p-(2,5-dihydro-3-cyano-2-oxo-4-phenyl-5-furylidenemethyl)benzoate]

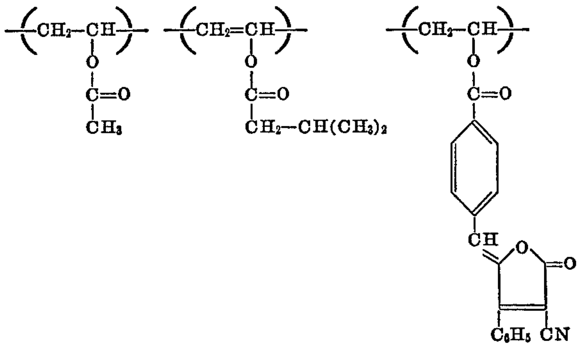

Poly(vinyl alcohol) (Elvanol 52-22) (3.8 g., 0.076 mole) is soaked for about 16 hours in 100 ml. of dry pyridine on a steam bath. After cooling to 20° C., 2.3 g. (0.019 mole) of isovaleryl chloride is added and the suspension heated for 1 hour at 50° C. and again cooled to room temperature. After cooling, 12.7 g. (0.038 mole) of 5-(p-chlorocarbonylbenzylidene) - 3 - cyano-4-phenyl-2(5H)-furanone is added, the mixture stirred for 15 minutes, heated for 1 hour at 50° C. and again cooled to room temperature. After cooling, 2.4 g. (0.020 mole) of isovaleroyl chloride is added, the mixture again heated for 1 hour at 50° C., and then poured into 800 ml. of vigorously stirred water. The finely divided polymer is collected by filtration, washed 4 times with 200 ml. portions of water, air dried for 48 hours and then dried in a vacuum desiccator for 24 hours to yield 18 g. of yellow powder.

| Sensitizer | Sensitivity value | $\lambda_{max.}$ (nm.) | Coating and developing solvent |
|---|---|---|---|
| None | 21,000 | 367 | DMF |
| A | 15,000 | 440 | DMF |

Example 35.—Preparation of poly{2-[p-(3-cyano-4-phenyl-2(5H)-furanone - 5 - ylidenemethyl)cinnamoyloxy] tri-methylene-2,2-bis(4-oxyphenyl)propane}

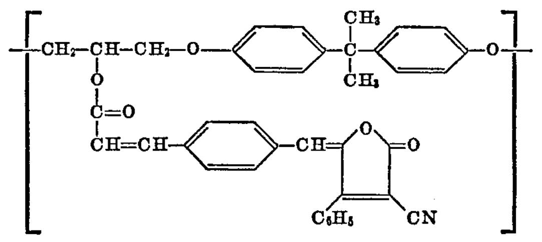

To 150 ml. of dry pyridine is added with stirring at room temperature 7.7 g. (0.0271 mole) of Phenoxy Resin PRDA 8030 (Union Carbide Co.). The mixture is stirred until a solution results (3 hours). To the solution is added with stirring at room temperature 9.8 g. (0.027 mole) of 5-[p-(2-chlorocarbonylvinyl)benzylidene] - 3 - cyano-4-phenyl-2(5H)-furanone in small portions over a 10-minute period. The mixture is stirred 10 minutes more, then heated at 50° C. for 1 hour. A solution results. The dope is cooled to room temperature and poured into 800 ml. of vigorously stirred water. The finely divided polymer is collected by filtration, washed 3 times with 200 ml. portions of water, air dried for 5 hours, then dried in a vacuum desiccator over anhydrous calcium chloride for 48 hours to yield 12.5 g. of yellow powder.

The invention has been described in detail with particular reference to preferred embodiments thereof, but it will be understood that variations and modifications can be effected within the spirit and scope of the invention.

What is claimed is:

1. A light-sensitive, linear, film-forming polymer having attached to a polymer backbone, which is the residue of a polymer selected from the groups consisting of hydroxyl-containing polymers, reactive amino-containing polymer and reactive anhydride-containing polymers, a light-sensitive moiety selected from the group consisting of 1 - arylmethyleneindene groups and 5 - arylmethylene-2(5H)-furanone groups, the light-sensitive moiety being attached to the backbone through a carbonyloxy group when the backbone is the residue of a hydroxyl-containing polymer, through an amido group when the backbone is the residue of a reactive amino-containing polymer and through an oxycarbonyl group when the backbone is the residue of a reactive anhydride-containing polymer.

2. A light-sensitive polymer as defined in claim 1 wherein the light-sensitive moiety is the residue of a carboxylic acid selected from the group consisting of 1-arylmethylene-3-indenecarboxylic acids, 1-indenylidenemethylaromatic acids, 5-arylmethylene-2(5H)-furanone-3-carboxylic acids and 2(5H)-furanon-5-ylidenemethylaromatic acids.

3. A light-sensitive, linear, film-forming polymer comprising a polymer backbone which is the residue of a hydroxyl-containing polymer, at least 25 percent of the hydroxyl units on the polymer backbone being substituted by light-sensitive units derived from a carboxylic acid selected from the group consisting of 1-arylmethylene-3-indenecarboxylic acids, 1 - indenylidenemethylaromatic acids, 5 - arylmethylene - 2(5H) - furanone-3-carboxylic acids and 2(5H)-furanon-5-ylidenemethylaromatic acids, the light-sensitive units being attached to the polymer backbone through carbonyloxy groups.

4. A light-sensitive polymer as defined in claim 3 wherein up to 75 percent of the hydroxyl units on the polymer backbone are substituted by non-light-sensitive units which are the residue of a different carboxylic acid.

5. A light-sensitive polymer as defined in claim 3 wherein the hydroxyl-containing polymer is the condensation product of a bisphenol with epichlorohydrin.

6. A light-sensitive polymer as defined in claim 5 wherein the light-sensitive units are derived from a carboxylic acid selected from the group consisting of
1-benzylidene-3-indenecarboxylic acid,
1-furfurylidene-3-indenecarboxylic acid,
3-(2-ethylhexoxycarbonyl)-1-indenylidenemethylbenzoic acid,
3-(2-ethylhexoxycarbonyl)-1-indenylidenemethylcinnamic acid, and
p-(4,7-dimethyl-3-methoxycarbonyl-1-indenylidenemethyl)cinnamic acid.

7. A light-sensitive, linear, film-forming polymer comprising a polymer backbone which is the residue of polyvinyl alcohol, and having at least 25 percent of the hydroxyl groups on the polymer backbone substituted by light-sensitive units which are the residue of a carboxylic acid selected from the group consisting of 1-arylmethylene-3-indene carboxylic acids, 1-indenylindene-methylaromatic acids, 5-arylmethylene-2(5H)-furanone-3-carboxylic acids and 2-(5H)-furanon-5-ylidenemethylaromatic acids, the light-sensitive units being attached to the polymer backbone through carbonyloxy groups.

8. A light-sensitive polymer as defined in claim 7 wherein the light-sensitive units are the residue of a carboxylic acid selected from the group consisting of
1-benzylidene-3-indenecarboxylic acid,
1-furfurylidene-3-indenecarboxylic acid,
3-(2-ethylhexoxycarbonyl)-1-indenylidenemethylbenzoic acid,
3-(2-ethylhexoxycarbonyl)-1-indenylidenemethylcinnamic acid, and
p-(4,7-dimethyl-3-methoxycarbonyl-1-indenylidenemethyl)cinnamic acid.

9. A light-sensitive, linear, film-forming polymer having attached to a polymer backbone which is the residue of a polymer selected from the group consisting of hydroxyl-containing polymers, reactive amino-containing polymers and reactive anhydride-containing polymers, a light-sensitive moiety selected from the group having the following formulae:

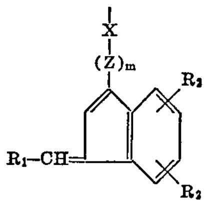

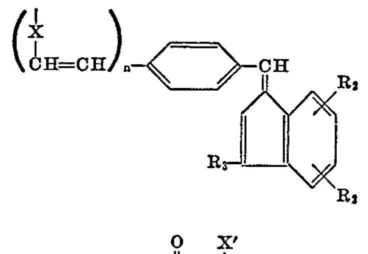

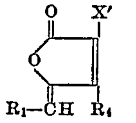

and

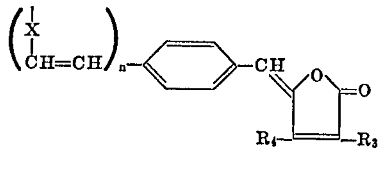

wherein $R_1$ is an aromatic group; each $R_2$ is selected from the group consisting of hydrogen atoms, alkyl groups, and alkoxy groups; $R_3$ is selected from the group consisting of alkoxycarbonyl groups and cyano groups; $R_4$ is an aryl group; X is a carbonyloxy group when the backbone is the residue of a hydroxyl-containing polymer, an amido group when the backbone is the residue of a reactive amino-containing polymer and an oxycarbonyl group when the backbone is the residue of a reactive anhydride-containing polymer; Z is an arylmethylidyne group and *m* and *n* are each 0 or 1.

10. A light-sensitive polymer as defined in claim 9 wherein the polymer backbone is the residue of a hydroxyl-containing polymer and X is a carbonyloxy group.

References Cited

UNITED STATES PATENTS 2,725,372 11/1955 Minsk ............. 260—91.3

JAMES A. SEIDLECK, Primary Examiner

S. M. LEVIN, Assistant Examiner

U.S. Cl. X.R.

260—32.6 R, 33.8 EP, 33.8 UA, 75 T, 78.5 R, 85.7, 89.7 S, 91.3 VA, 209.6 212, 214, 232, 233.3 R, 233.5, 234; 96—35.1; 117—34